United States Patent [19]

Asick et al.

[11] 4,130,934

[45] Dec. 26, 1978

[54] METHOD FOR TERMINATING HIGH DENSITY CABLE

[75] Inventors: John C. Asick, Harrisburg; Clifton W. Huffnagle, Camp Hill, both of Pa.

[73] Assignee: AMP Incorporated, Harrisburg, Pa.

[21] Appl. No.: 858,128

[22] Filed: Dec. 6, 1977

[51] Int. Cl.² .................. H01B 7/08; H01B 13/00; H02G 1/14

[52] U.S. Cl. ............................ 29/628; 29/624; 29/630 A; 174/117 F; 339/14 R

[58] Field of Search ............ 29/628, 626, 624, 630 R; 339/14 R, 97, 98, 99, 17.5; 174/117 F

[56] References Cited

U.S. PATENT DOCUMENTS

| | | |
|---|---|---|
| 3,189,864 | 6/1965 | Angele et al. .................. 339/17 F X |
| 3,284,756 | 11/1966 | Vanstrom ..................... 339/17 F X |
| 3,615,283 | 10/1971 | Lang ........................... 29/624 |
| 3,636,991 | 1/1972 | Webster ....................... 29/630 X |
| 3,772,775 | 11/1973 | Bonnke et al. ................. 339/17 F |
| 4,075,758 | 2/1978 | Parsons et al. ................ 29/630 A X |

*Primary Examiner*—Victor A. Di Palma
*Attorney, Agent, or Firm*—Russell J. Egan

[57] ABSTRACT

An improved conductor preparation and termination means and method are disclosed for terminating multi-conductor flat cable having a high density arrangement of conductors on close centerlines. The present invention is particularly useful for mass termination of flat transmission cable and/or ribbon cable. The subject method and means is primarily distinguished from the known methods and means for terminating cable in that in the present instance at least some of the conductors are pushed from the insulation of the cable to a position where they are exposed and can be engaged by suitable terminating means.

13 Claims, 10 Drawing Figures

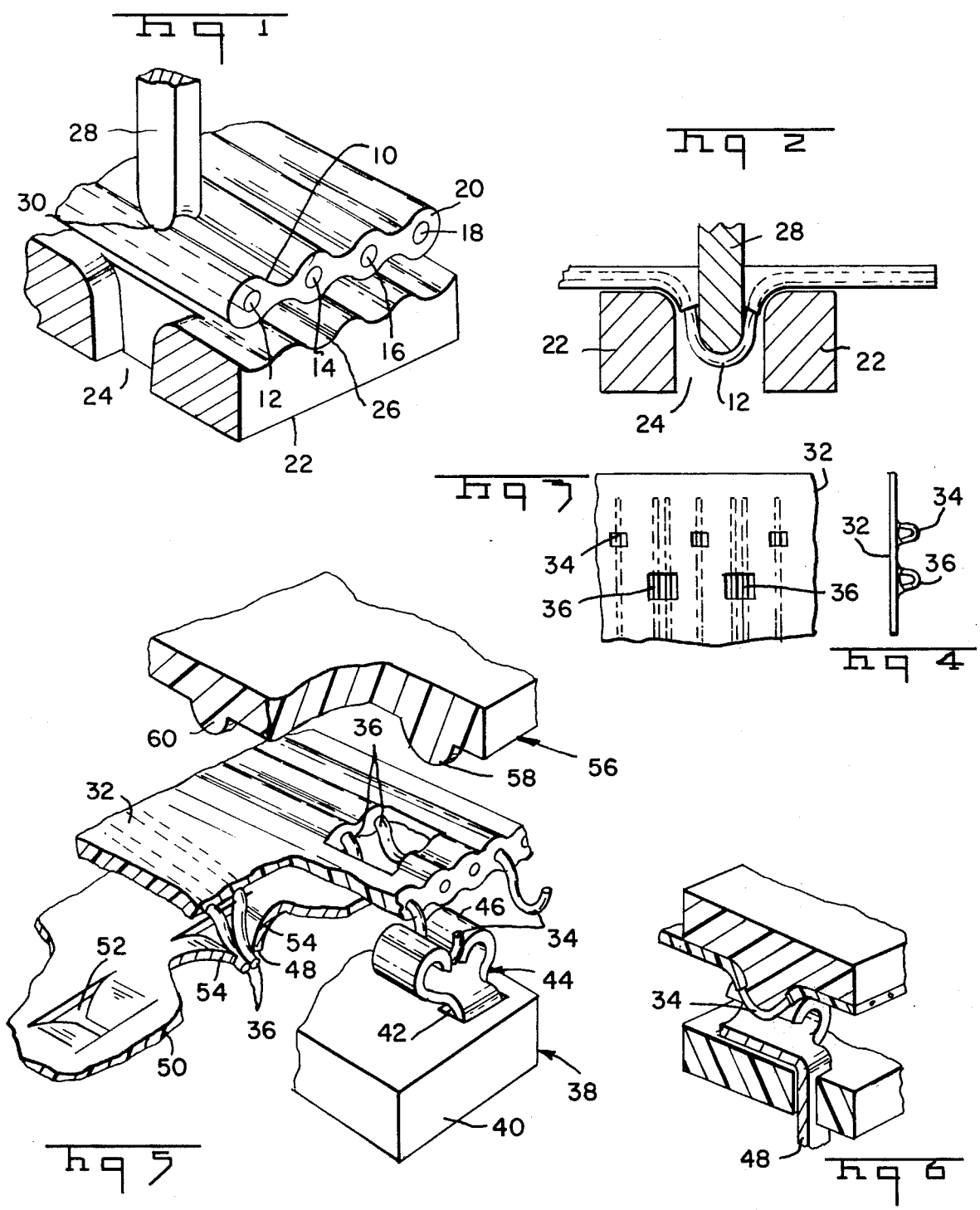

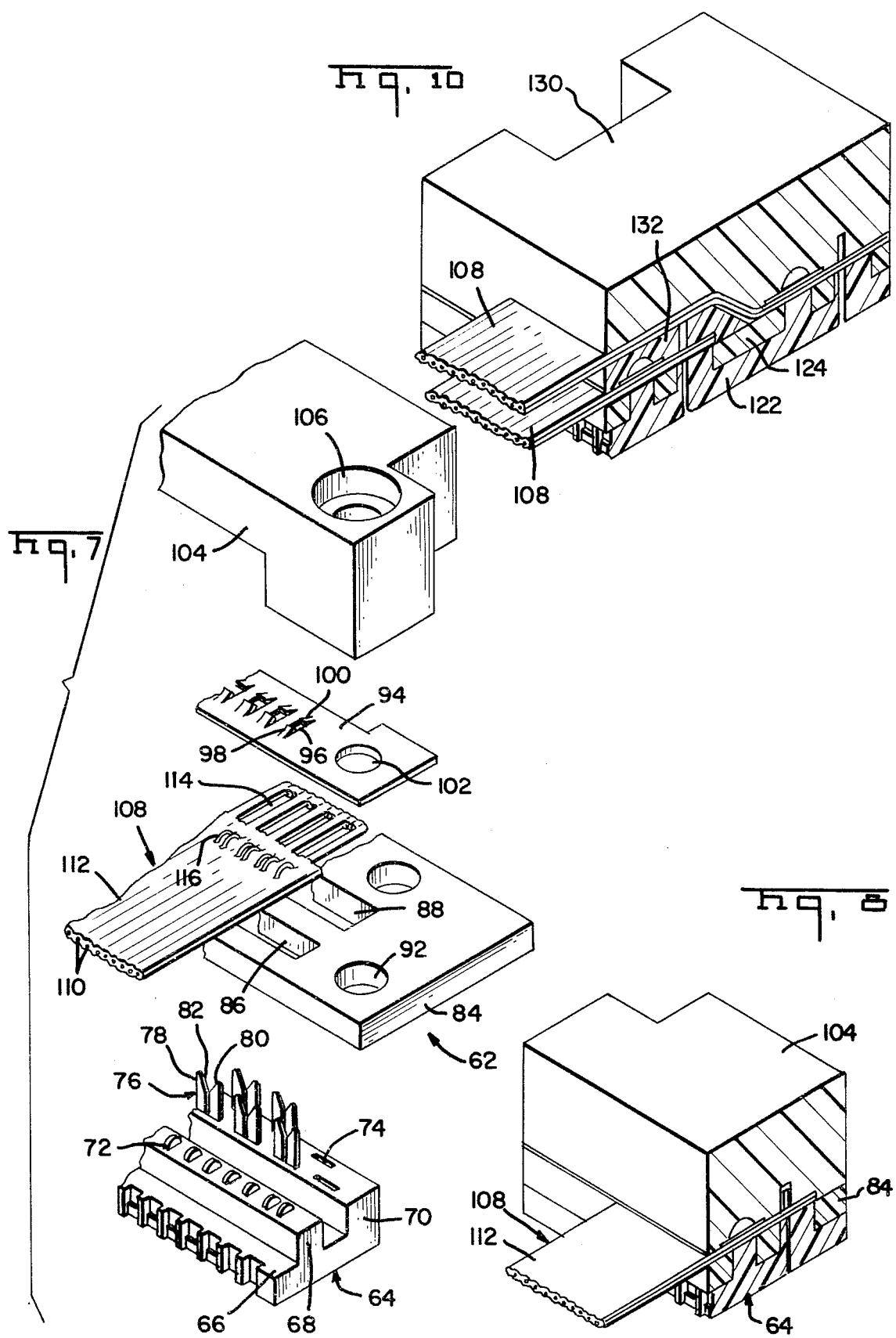

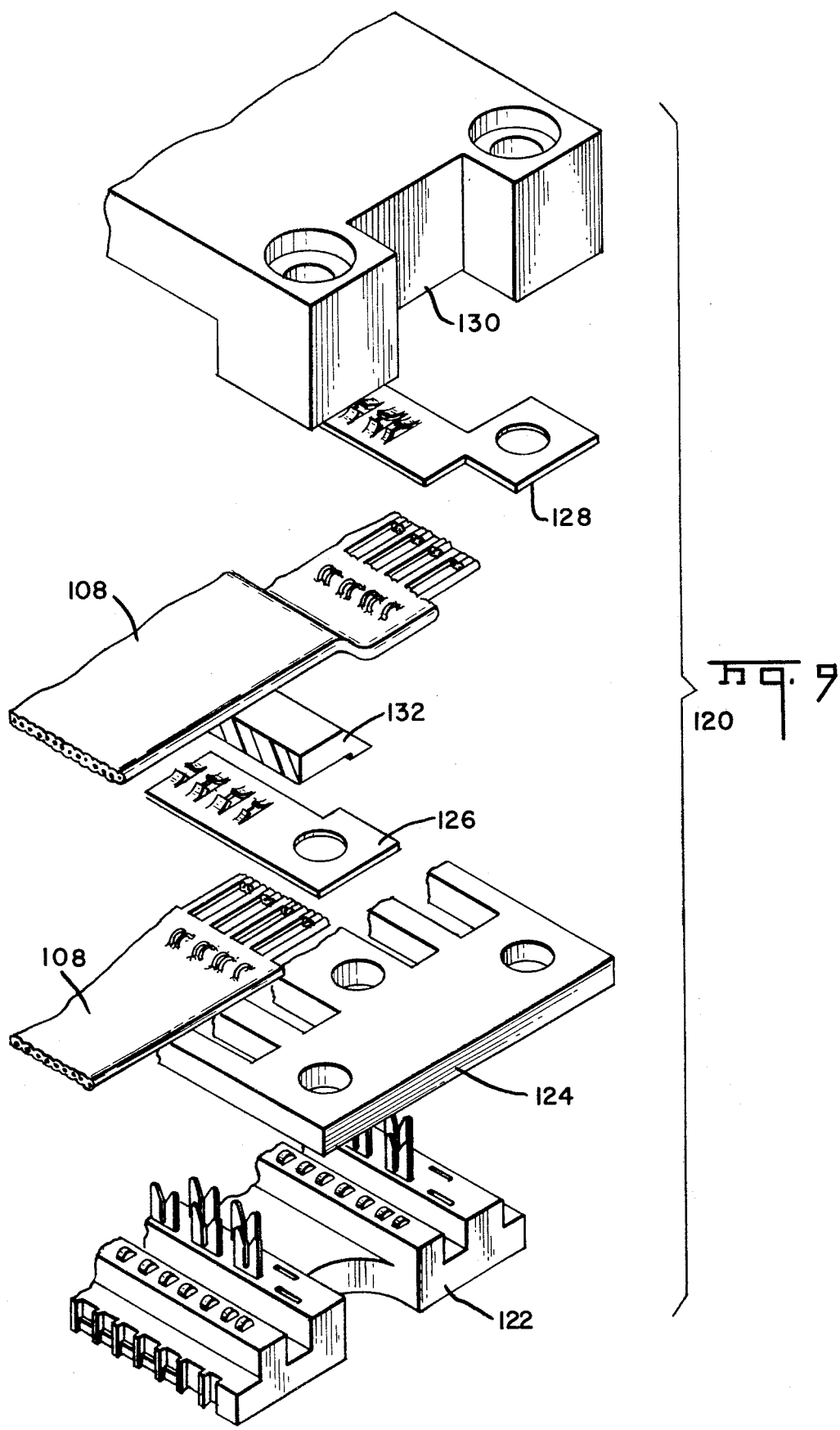

METHOD FOR TERMINATING HIGH DENSITY CABLE

BACKGROUND OF THE INVENTION

The Field Of The Invention

The present invention relates to a method and means for termination of a flat transmission cable and/or ribbon cable having a plurality of conductors on a close centerline arrangement and in particular to a method and means which cause at least some of the conductors to be acted on to extend at least partially from the insulation of the cable to a position enabling termination thereof.

The Prior Art

It is well known in the electrical connector industry to effect termination of insulated multi-conductor flat flexible cable by utilizing terminals having at least a pair of insulation piercing tine or fork-like projections defining a conductor engaging slot therebetween. The tines are pressed into the insulation of the cable on either side of a conductor which is guided into and engaged by the walls of the slot. An example of such a termination method and means can be found in U.S. Pat. No. 3,820,055.

It has also been known to terminate some cable by staking the conductors with a post-like member so as to force fit the conductor into a plated through hole of a printed circuit board or the like. Such a method and means can be found in U.S. Pat. No. 4,049,334.

The present invention can be distinguished from the above discussed prior art by the fact that at least some of the conductors are individually acted upon so as to be pushed from the insulation of the cable to be exposed therefrom in a position enabling them to be terminated. The thus prepared cable can be terminated by a variety of termination means, as will be described below.

SUMMARY OF THE INVENTION

The present invention relates to an improved wire preparation and termination means and method in which at least selected conductors of a multi-conductor flat flexible cable, having a plurality of conductors embedded in an insulation material on close centerlines, are acted upon by cutting the insulation and pushing the conductor so as to be exposed through the cut insulation. When conductors or groups of conductors are so prepared, they can be terminated in their exposed condition. Conductors that are not so prepared can be terminated by more conventional means, such as by insulation piercing terminals.

It is therefore an object of the present invention to teach an improved wire preparation and termination means and method whereby closely spaced conductors in a multi-conductor, flat transmission cable or the like can be terminated without the risk of shorting between adjacent conductors.

It is a further object of the present invention to teach a method conductor of preparation and termination whereby selected conductors in a multi-conductor flat flexible cable are cut, the insulation slit at a location removed from the cut end of the conductor and the conductor poked from the slit to enable termation of the exposed portion.

It is a further object of the present invention to teach an improved method of preparing and terminating the conductors of a multiple conductor flat cable, such as a transmission cable, which method can be applied so as to terminate multiple layers of cable in a single connector.

It is yet another object of the present invention to teach a method and means for terminating the conductors of a multiple conductor flat cable, such as a transmission cable or the like, which method and means can be readily and economically produced and practiced.

The means for accomplishing the foregoing objects and other advantages will become apparent to those skilled in the art from the following detailed description taken with reference to the accompanying drawings.

BRIEF DESCRIPTION OF THE DRAWINGS

FIG. 1 is a perspective schematic representation of a multi-conductor flat flexible cable and means to prepare a conductor thereof for termination according to the present invention;

FIG. 2 is a side elevation, partially in section, diagrammatically illustrating a step of conductor preparation according to the present invention;

FIG. 3 is a plan view of an end portion of a multi-conductor flat cable prepared for termination in accordance with the present invention;

FIG. 4 is a side elevation of the prepared cable of FIG. 3;

FIG. 5 is an exploded perspective view, partially broken away and partially in section, of a portion of a connector for terminating the prepared cable of FIGS. 3 and 4 in accordance with the present invention;

FIG. 6 is a perspective view, partially in section, showing the connector of FIG. 5 in an assembled condition;

FIG. 7 is an exploded perspective view of a first alternate connector for terminating multi-conductor flat cable prepared for termination according to the present invention;

FIG. 8 is a perspective view of the connector of FIG. 7 in a fully assembled condition;

FIG. 9 is an exploded perspective view of an alternate embodiment of the connector of FIGS. 7 and 8 for terminating several layers of multi-conductor cables each prepared for termination in accordance with the present invention; and FIG. 10 is a perspective view of the connector of FIG. 9 in an assembled condition.

DETAILED DESCRIPTION OF THE PREFERRED EMBODIMENT

A multi-conductor flat flexible cable 10 is shown in FIG. 1 with a plurality of conductors 12, 14, 16, 18 held in a closely spaced, parallel configuration by insulating material 20 which can be either extruded or laminated onto the conductors. The cable is positioned on an anvil 22 having a plurality of profiled apertures 24 therein. The surface 26 of the anvil may be profiled with a series of parallel flutes to aid in centering the conductors of the cable with the respective profiled apertures 24. A piercing and forming blade 28 is positioned above each aperture and has a profiled leading edge 30, here shown as a pair of parallel, spaced arcuate leading portions, and is arranged to come down so that the blade 30 pierces the insulation on opposite sides of a conductor and a central portion forces the conductor to pass into the profile aperture 24 to form a loop, as shown in FIG. 2. It will be also appreciated from FIG. 2 that as the loop of the conductor is formed, the conductor will be pulled backward from the nearest free end of the cable. In some instances it may be necessary to cut the conductor transversely at a location spaced from the piercing and forming blade 28 so as to allow the conductor to have sufficient movement to form the profiled loop.

FIGS. 3 and 4 show a plan view and a side elevation, respectively, of a cable 32 prepared in accordance with FIGS. 1 and 2. The cable 32 of FIGS. 3 and 4 is a multi-conductor flat transmission cable having a signal conductor 34 flanked on both sides with a ground conductor 36 so that the arrangement of conductors across the cable appears signal-ground-ground-signal-ground-ground, etc. In this instance, the cable has been profiled so that the signal conductors 34 are exposed at a first location and the ground conductors 36 are exposed singly or in pairs at a second displaced location. The slits exposing the conductors have been exaggerated, for sake of clarity, and shown more in the form of windows. It is, of course, within the perview of the invention to form larger openings in the insulation if spacing permits and such configuration is desired.

The cable of FIGS. 3 and 4 is shown as it might be terminated in a connector 38 in FIG. 5. The connector includes a base housing 40 of insulating material having a plurality of terminal receiving apertures 42, each having a terminal 44 mounted therein. Each terminal includes a conductor engaging portion 46 and a matable portion 48 of any known configuration. A conductive ground plane 50 having therein a series of profiled apertures 52, each defined by inwardly extending tines 54, 56, is mounted on the base spaced rearwardly of apertures 42. The housing is closed by a cover 56 of insulating material having two rows of downwardly projecting tines 58, 60 which are respectively aligned with the prepared conductors 34 and terminals 44 and with the conductors 36 and apertures 52.

The assembly of the connector can readily be understood by comparison of FIGS. 5 and 6. Bringing the cover 56 into engagement with the cable 32 causes the tines 58 to engage the respective conductors 34, 36 and drive the former into portion 46 of terminals 44 and the latter into apertures 52 of ground plane 50 to form the desired interconnection. The cover 56 will then be secured to the base 40 by any of the conventional and well known means (not shown).

A first alternate embodiment of a connector suitable for terminating flat cable prepared in accordance with the present invention is shown in FIGS. 7 and 8. This connector 62 includes a housing member 64 of insulation material having a base 66 with first and second raised portions 68, 70, respectively, integrally extending therefrom in parallel spaced relation. The first portion 68 has a plurality of molded, integral tines 72 extending from the upper surface thereof and the second portion 70 has a plurality of terminal receiving recesses or passages 74 formed therein. A terminal 76 is mounted in each passage 74. Each terminal 76 has an insulation piercing first end formed by a pair of tines 78, 80 defining conductor engaging slot 82 therebetween and a second end (not shown) having any well known mating configuration. An intermediate member 84 of rigid conductive material includes a pair of parallel spaced apertures 86, 88 aligned to receive therein the first and second projections 68, 70, respectively. The intermediate member 84 also includes mounting apertures 92 at the ends thereof. A conductive ground plane 94 has a plurality of conductor receiving apertures 96 formed therein by pairs of inwardly directed tines 98, 100. The ground plane 94 also has mounting apertures 102 at the ends thereof. The connector is completed by a cover 104 which is profiled to enclose the rest of the connector and includes mounting apertures at the ends thereof.

The cable 108 has a plurality of conductors 110 embedded therein in an insulation layer 112. The cable is prepared in a fashion similar to the previously described method. Windows 114 have been punched in the cable to remove a rectangular section of insulation and the conductor lying therein. The conductor 116 freed or shortened by the windowing is prepared as previously described to be pushed from the insulation and form an exposed loop. The conductors not severed by the windows remain encased in insulation. The pattern of conductors which are and are not windowed can be according to needs, for example the previously discussed signal-ground configuration.

The connector 62 is assembled by putting the plate 84 on the base 66 with portions 68, 70 extending through apertures 86, 88, respectively. The intermediate plate 84 serves to both strengthen the connector and prevent bowing and as a means to connect the ground plane 94 to a circuit ground when the connector is installed. The prepared cable 108 is placed in the connector so that the tines 72 are aligned with the rear of the looped conductors 116 and the insulated conductors between the windows are aligned with the respective slots in the terminals 76. The cable is then terminated by terminals 76 in the standard manner and the ground plane 94 is applied to engage the conductors 116, the tines 72 preventing collapse of the conductor loops during this application. The cover is then secured to the connector, by means not shown, and the connector is ready for mounting with conductive members (also not shown) interconnecting the ground plane 94 with circuit ground.

The second alternate embodiment, shown in FIGS. 9 and 10, is similar to that of FIGS. 7 and 8 and is intended for terminating pairs of prepared cables. Connector 120 has a base portion 122 which is equivalent to two members 64 joined in an aligned condition. Intermediate member 124 likewise is the equivalent of two members 84. Ground planes 126 and 128 are substantially the same as ground plane 94 and cover 130 is a doubled version of cover 104. The connector 120 includes an additional part not found in connector 62. The connector 120 has an insulated spacer bar 132 which is positioned between the two prepared flat cables 108 to prevent any shorting between the upper cable and the lower cable.

It would be possible to continue extending connector embodiments, as above, to handle more cables. Likewise, it would be possible to bring the cables in from opposite sides of the connector and/or use the connector to splice two or more cables together.

The present invention may be subject to many changes and modifications without departing from the spirit or essential characteristics thereof. The present embodiments should, therefore, be considered in all respects as illustrative and not restrictive of the scope of the invention.

We claim:

1. A method for preparing multi-conductor flat cable for termination, said cable having a plurality of parallel spaced conductors encased in insulation, said method comprising the steps of:

cutting at least a longitudinal slit in the insulation adjacent each conductor to be terminated;

applying force to said conductor from one side of the cable causing said conductor to form a loop exposed from the other side of said cable; and terminating each said conductor by inserting said exposed loop between resilient conductor engaging portions of an electrical terminal making good electrical and mechanical contact therebetween.

2. A method according to claim 1 wherein:
said insulation is slotted on both lateral sides of each said conductor to be terminated.

3. A method according to claim 1 wherein:
at least some of said conductor loops are exposed at a first location extending transversely across said cable.

4. A method according to claim 1 wherein:
at least of said conductor loops are exposed at a first location extending transversely across said cable; and
at least some of the remaining conductor loops are exposed at a second location extending transversely across said cable spaced from said first location.

5. A method according to claim 3 further comprising the step of:
cutting each said conductor at a point remote from, said first location whereby said conductor moves more easily through the insulation during formation of said loop.

6. A method according to claim 5 wherein:
each said conductor is cut at a sufficient distance from said first location that the free end of said conductor remains in the insulation upon formation of said loop.

7. A method according to claim 1 wherein:
at least one window is formed in said cable, said at least one window removing a section of insulation and underlying conductor leaving at least one fully insulated conductor between adjacent pairs of windows.

8. A method for terminating multi-conductor flat cable having a plurality of conductors embedded in insulation in a parallel spaced array, said method comprising the steps of:
cutting a longitudinal slot in the insulation adjacent a conductor of said cable;
applying force to said conductor from a first side of said cable causing said conductor to form a loop exposed from the opposite side of said cable; and
inserting said exposed loop into a conductor engaging portion of an electrical terminal.

9. The method according to claim 8 wherein adjacent conductors of said cable are exposed in a pattern arrangement thereby avoiding shorting between selected conductors.

10. A method for terminating at least some of the plurality of conductors of a multi-conductor flat cable comprising the steps of:
forming at least one transverse slot in said cable to cut at least some of said conductors;
cutting at least one longitudinal slot in the insulation remote from each said transverse slot and immediately adjacent a respective conductor;
applying a force through said slot from a first side of said cable and against said conductor to expose it in a loop from the other side of said cable; and
terminating said exposed loop with a first terminal means.

11. A method according to claim 10 further comprising the steps of:
exposing the conductors of said cable in a patterned array of loops whereby shorting between selected conductors is avoided.

12. A method according to claim 10 wherein:
said transverse slots and said at least one longitudinal slot form windows in said cable removing a section of insulation and the underlying conductor leaving at least one fully insulated conductor between adjacent windows; and
terminating said fully insulated conductor with insulation piercing second terminal means.

13. A method according to claim 10 wherein:
said longitudinal slots are formed on both sides of said conductors.

* * * * *

UNITED STATES PATENT OFFICE
CERTIFICATE OF CORRECTION

Patent No. 4,130,934            Dated December 26, 1978

Inventor(s) John C. Asick Et Al

It is certified that error appears in the above-identified patent and that said Letters Patent are hereby corrected as shown below:

Column 5, line 16, after "at least" insert

- - - some - - - .

Column 6, line 11, "pattern" should read

- - - patterned - - - .

Signed and Sealed this

Tenth Day of April 1979

[SEAL]

Attest:

RUTH C. MASON
*Attesting Officer*

DONALD W. BANNER
*Commissioner of Patents and Trademarks*